(12) United States Patent
Clarke

(10) Patent No.: US 7,818,679 B2
(45) Date of Patent: *Oct. 19, 2010

(54) METHOD, SYSTEM, AND APPARATUS FOR ENABLING NEAR REAL TIME COLLABORATION ON AN ELECTRONIC DOCUMENT THROUGH A PLURALITY OF COMPUTER SYSTEMS

(75) Inventor: Simon Peter Clarke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

This patent is subject to a terminal disclaimer.

(21) Appl. No.: 10/920,640

(22) Filed: Aug. 18, 2004

(65) Prior Publication Data

US 2005/0234943 A1 Oct. 20, 2005

Related U.S. Application Data

(60) Provisional application No. 60/563,685, filed on Apr. 20, 2004.

(51) Int. Cl.
G06F 3/00 (2006.01)
(52) U.S. Cl. .................. 715/751; 715/748; 715/753; 715/755; 715/758; 709/201; 709/204; 709/240; 709/245; 709/248
(58) Field of Classification Search ......... 715/751–759, 715/748; 370/437, 449; 709/201–205, 238–240, 709/245, 246; 719/311, 312, 329
See application file for complete search history.

(56) References Cited

U.S. PATENT DOCUMENTS

| | | | | |
|---|---|---|---|---|
| 4,590,468 A | * | 5/1986 | Stieglitz | 370/450 |
| 5,220,657 A | * | 6/1993 | Bly et al. | 711/152 |
| 5,274,644 A | * | 12/1993 | Berger et al. | 370/230 |
| 5,280,582 A | * | 1/1994 | Yang et al. | 709/225 |
| 5,408,470 A | * | 4/1995 | Rothrock et al. | 370/261 |
| 5,537,526 A | | 7/1996 | Anderson et al. | |
| 5,596,576 A | * | 1/1997 | Milito | 370/450 |
| 5,634,122 A | * | 5/1997 | Loucks et al. | 707/8 |
| 5,649,105 A | * | 7/1997 | Aldred et al. | 709/220 |
| 5,758,079 A | * | 5/1998 | Ludwig et al. | 709/204 |

(Continued)

FOREIGN PATENT DOCUMENTS

JP 2001-067257 3/2001
KR 2003037822 A * 5/2003

OTHER PUBLICATIONS

"A Java 3D-Enabled Cyber Workspace;" Lihui Wang, Brian Wong, Weiming Shen, Sherman Lang; Communications of the ACM, vol. 45, No. 11; Nov. 2002.*

(Continued)

*Primary Examiner*—Ba Huynh
*Assistant Examiner*—Eric Wiener
(74) *Attorney, Agent, or Firm*—Merchant & Gould

(57) ABSTRACT

A method, system, and apparatus are provided for collaborating on an electronic document. According to the method, a data structure may be maintained at each of the computer systems participating in the collaborative session that represents the contents of a shared document. When user input is received at one of the computer systems modifying the document, the data structure is updated to reflect the modification. In response to the modification, the changes to the data structure are periodically identified and collected as a revision that identifies only the changes made to the data structure as a result of the edits made since the previous revision was taken. The revision is packaged and transmitted to each of the participants in the sharing session. The revisions are merged into the copy of the data structure stored at the participating computer systems.

20 Claims, 14 Drawing Sheets

U.S. PATENT DOCUMENTS

| | | | | |
|---|---|---|---|---|
| 5,796,396 | A * | 8/1998 | Rich | 715/741 |
| 6,067,551 | A * | 5/2000 | Brown et al. | 1/1 |
| 6,112,323 | A | 8/2000 | Meizlik et al. | 714/748 |
| 6,151,619 | A * | 11/2000 | Riddle | 709/204 |
| 6,199,116 | B1 | 3/2001 | May et al. | 709/310 |
| 6,201,859 | B1 * | 3/2001 | Memhard et al. | 379/93.21 |
| 6,243,740 | B1 * | 6/2001 | Minneman et al. | 709/206 |
| 6,285,363 | B1 * | 9/2001 | Mairs et al. | 715/751 |
| 6,334,141 | B1 * | 12/2001 | Varma et al. | 709/205 |
| 6,343,313 | B1 * | 1/2002 | Salesky et al. | 709/204 |
| 6,381,215 | B1 | 4/2002 | Hamilton et al. | 370/236 |
| 6,392,993 | B1 | 5/2002 | Hamilton et al. | 370/230 |
| 6,438,603 | B1 | 8/2002 | Ogus | 709/233 |
| 6,457,043 | B1 * | 9/2002 | Kwak et al. | 709/204 |
| 6,463,078 | B1 | 10/2002 | Engstrom et al. | 370/466 |
| 6,496,201 | B1 * | 12/2002 | Baldwin et al. | 715/753 |
| 6,570,590 | B1 | 5/2003 | Dubrow et al. | 345/751 |
| 6,574,674 | B1 | 6/2003 | May et al. | 709/313 |
| 6,584,493 | B1 | 6/2003 | Butler | 709/204 |
| 6,587,875 | B1 | 7/2003 | Ogus | 709/223 |
| 6,629,129 | B1 | 9/2003 | Bookspan et al. | 709/204 |
| 6,704,769 | B1 * | 3/2004 | Comstock et al. | 709/204 |
| 6,760,749 | B1 * | 7/2004 | Dunlap et al. | 709/204 |
| 6,807,562 | B1 * | 10/2004 | Pennock et al. | 709/204 |
| 6,928,467 | B2 | 8/2005 | Peng | 709/219 |
| 6,983,324 | B1 * | 1/2006 | Block et al. | 709/228 |
| 7,010,565 | B2 * | 3/2006 | Sampson | 709/202 |
| 7,035,229 | B1 * | 4/2006 | Lynch et al. | 370/260 |
| 7,072,354 | B1 * | 7/2006 | Beathard | 370/447 |
| 7,206,811 | B2 * | 4/2007 | Skurikhin et al. | 709/205 |
| 7,237,006 | B1 * | 6/2007 | Prell | 709/205 |
| 7,266,776 | B2 * | 9/2007 | Quillen et al. | 715/758 |
| 7,330,480 | B2 * | 2/2008 | Khan et al. | 370/437 |
| 7,353,252 | B1 * | 4/2008 | Yang et al. | 709/204 |
| 2001/0000811 | A1 * | 5/2001 | May et al. | 709/205 |
| 2003/0101247 | A1 | 5/2003 | Kumbalimutt et al. | 709/221 |
| 2003/0163787 | A1 * | 8/2003 | Hay et al. | 715/522 |
| 2004/0034860 | A1 | 2/2004 | Fernando et al. | 719/315 |
| 2004/0037306 | A1 * | 2/2004 | Khan et al. | 370/437 |
| 2004/0068505 | A1 * | 4/2004 | Lee et al. | 707/100 |
| 2006/0136441 | A1 * | 6/2006 | Fujisaki | 707/101 |

OTHER PUBLICATIONS

"Virtual Collaboration and Media Sharing using COSMOS;" Vasilios Darlagiannis, Nicholas D. Georganas; Multimeadia Communications Research Laboratory, University of Ottawa, Proc. CSCC 2000, Greece; Jul. 2000.*

"Periodically—Definitions from Dictionary.com", http://dictionary.reference.com/browse/periodically, Oct. 12, 2007.*

Trossen et al., "SCCS: Scalable Conferencing Control Service," Computer Communications and Networks, Proceedings 7$^{th}$ International Conference on LaFayette, LA, USA, Oct. 12-15, 1998, IEEE Comput. Soc., pp. 698-705.

Chinese Official Action dated Oct. 17, 2008 cited in Application No. 200510066832.4.

Japanese Notice of Final Rejection dated Nov. 17, 2009 cited in Application No. 2005-122269.

Japanese Notice of Rejection dated Jun. 22, 2010 cited in Application No. 2005-122269.

Kazuo Watabe et al., "Multimedia Distributed Attendance Meeting System MERMAID," IPSJ Journal, vol. 32, No. 9, pp. 1200-1209, Information Processing Society of Japan, Japan, Sep. 15, 1991 (with English language translation and certification).

* cited by examiner

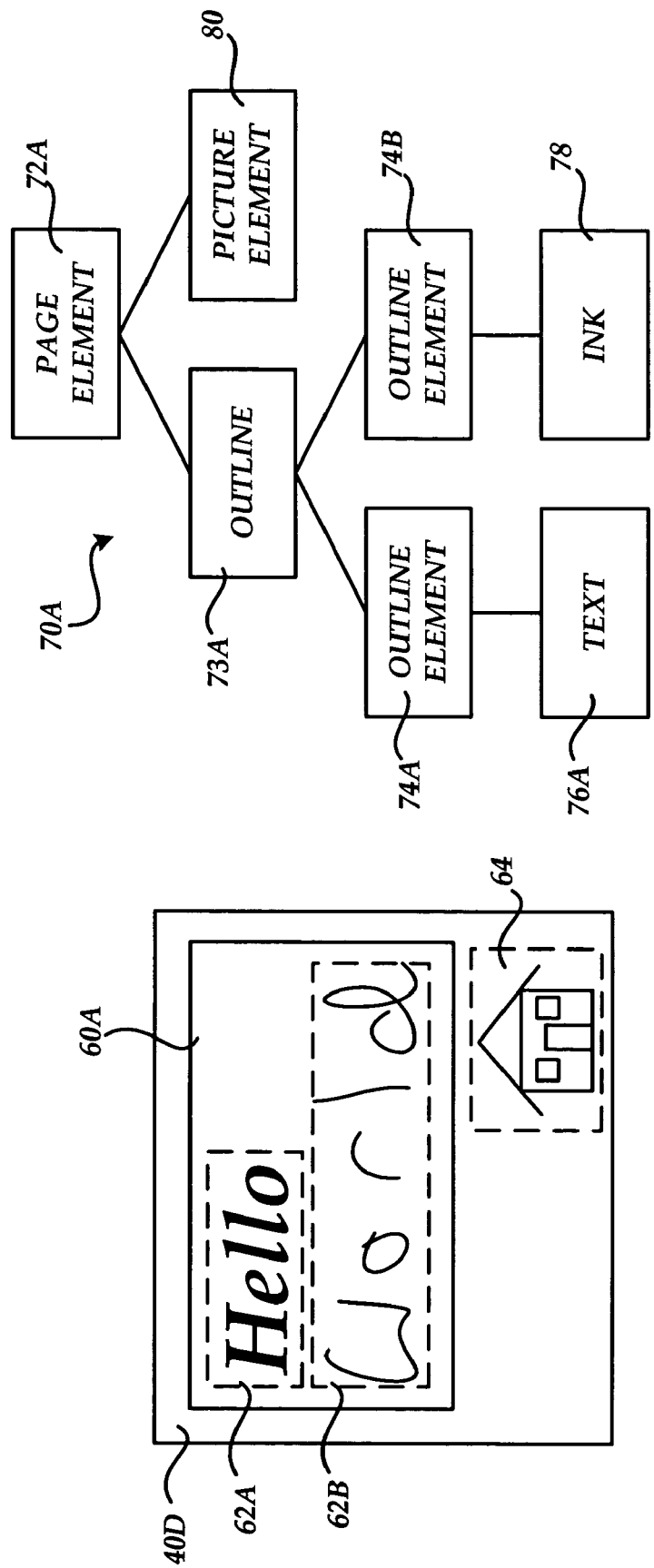

METHOD, SYSTEM, AND APPARATUS FOR ENABLING NEAR REAL TIME COLLABORATION ON AN ELECTRONIC DOCUMENT THROUGH A PLURALITY OF COMPUTER SYSTEMS

CROSS-REFERENCE TO RELATED APPLICATIONS

This application claims the benefit of U.S. provisional patent application No. 60/563,685, filed Apr. 20, 2004, which is entitled "OneNote Shared Session Feature" and which is expressly incorporated herein by reference.

BACKGROUND OF THE INVENTION

With the advent and explosion of the Internet, network computing applications have been created that allow remote computer users to work together on a common task. For instance, applications exist that allow remote users to view a common whiteboard, to view and interact with a slide presentation, to chat with one another, and to perform other functions in a collaborative manner. This type of program typically increases productivity for users that need to collaborate but that are located in remote locations.

One shortcoming of the previous solutions for collaborating on a task via a computer network is that these previous solutions do not provide a satisfactory user experience during collaboration. For instance, the previous solutions typically suffer from reduced network performance because large amounts of data are continuously sent to all of the participants. In many cases, the application will slow drastically or even block the user from making input while data transmission is taking place. In this situation, the user will become acutely aware that the sharing process is taking place and may even become frustrated with the application.

Another reason the user experience suffers while collaborating with previous solutions stems from the fact that in a given group of collaborators there may be large discrepancies in the available network bandwidth and latency. For instance, in a given collaboration session several users may be connected to high speed local area network connections while other users may be limited to low speed dialup network connections. Utilizing the previous solutions, the users connected via dialup may have an extremely difficult time receiving and making updates to the shared document. This also can be very frustrating for a user.

It is with respect to these considerations and others that the various embodiments of the present invention have been made.

BRIEF SUMMARY OF THE INVENTION

In accordance with the present invention, the above and other problems are solved by a method, system, and apparatus for near real time collaboration on an electronic document through two or more computer systems. The embodiments of the invention permit two or more users participating in a sharing session to interactively create and modify an electronic document via a computer network. Changes to the electronic document are identified, packaged, and transmitted to each user in a manner that allows collaboration to occur in near real time, even in high latency, low bandwidth network scenarios. Moreover, because changes to the document are packaged as incremental revisions and transmitted to the participants, it is not necessary to transmit large amounts of data to enable near real time collaboration.

According to one aspect of the invention a method is provided for enabling near real time collaboration on an electronic document through two or more computers. According to the method, a data structure may be maintained at each of the computer systems participating in the collaborative session that represents the contents of a shared document. When user input is received at one of the computer systems modifying the document, the data structure is updated to reflect the modification. In response to the modification, the changes to the data structure are periodically identified and collected as a revision that identifies only the changes made to the data structure as a result of the edit. A revision identifies the changes made to the core data model that is utilized to represent the document as a result of any edits.

In order to ensure a valid progression among editing states, a determination may be made prior to transmitting the revision to other participants as to whether the copy of the data structure maintained at the computer system where the edits were received is the most recent version among the participants. If the data structure is not current, the revisions needed to make the data structure current may be retrieved from the other participants and applied to the data structure. Once the data structure is current, the revision is packaged and transmitted to each of the participants in the sharing session. Revisions are taken frequently to ensure that the size of the revisions are small enough to be quickly transmitted over a computer network.

When revisions are received at the other participating computer systems, the revisions are merged into the copy of the data structure stored at the participating computer system. The data structure may then be utilized to refresh the display of the shared document, thereby indicating the modifications at each of the participating computer systems in near real time. Edits may be received at any participating computer system and transmitted to the other participants in a similar manner.

In order to further ensure the valid progression of edits among the various participants, a synchronization token may be utilized. A synchronization token is a data structure that is passed between the participants. Only the computer system owning the synchronization token is permitted to create a new revision to the data structure. Therefore, prior to making any revision, a participating computer system must first determine if it owns the synchronization token. If it owns the synchronization token, it can proceed with making a new revision and transmitting the revision to the other participants. If it does not own the synchronization token, it must request the synchronization token from the participating computer system that currently owns the token.

In order to ensure the fair passing of the synchronization token among the participating computer systems, the request for the token may include data indicating the amount of time the requesting computer system has been waiting for the token. If no response is received to the request, another request may be sent indicating the extended duration of time that the computer system has been waiting for the token. When the owner of the synchronization token receives requests for the token, it examines each request to determine the participant that has been waiting the longest to receive the token and transmits the token to that computer system.

Other mechanisms may also be utilized to ensure that one and only one token exists among all of the participants. For instance, if requests go unfulfilled for the token for a predetermined period of time, a new token may be created. This may occur, for instance, if the computer system owning the token is disconnected from the network. Alternatively, tests may be performed periodically to determine whether two or more tokens exist among the participants. If two synchronization tokens exist, a deterministic algorithm is performed at each of the computer systems owning tokens to determine the token that should be discarded.

A mechanism is also provided to ensure that computer systems connected via low bandwidth connections are granted the token in a fair manner. Multiple tokens may also exist, but efforts are taken to minimize duplicates. According to this mechanism, a determination is made when a request for the token is received as to whether the token has already been passed along to another participant. If the token has already been transmitted, a "time to live" value in the request may be decremented. If the time to live value has not expired, the request may then be forwarded to the new owner of the synchronization token. In this manner, requests from participants on low bandwidth connects are effectively injected into the high bandwidth network.

The invention may be implemented as a computer process, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIG. 5A is a screen diagram showing an illustrative screen display utilized in an embodiment of the present invention;

FIG. 5B is a data structure diagram illustrating aspects of a graph data structure utilized in embodiments of the invention;

DETAILED DESCRIPTION OF THE INVENTION

Figure 1:
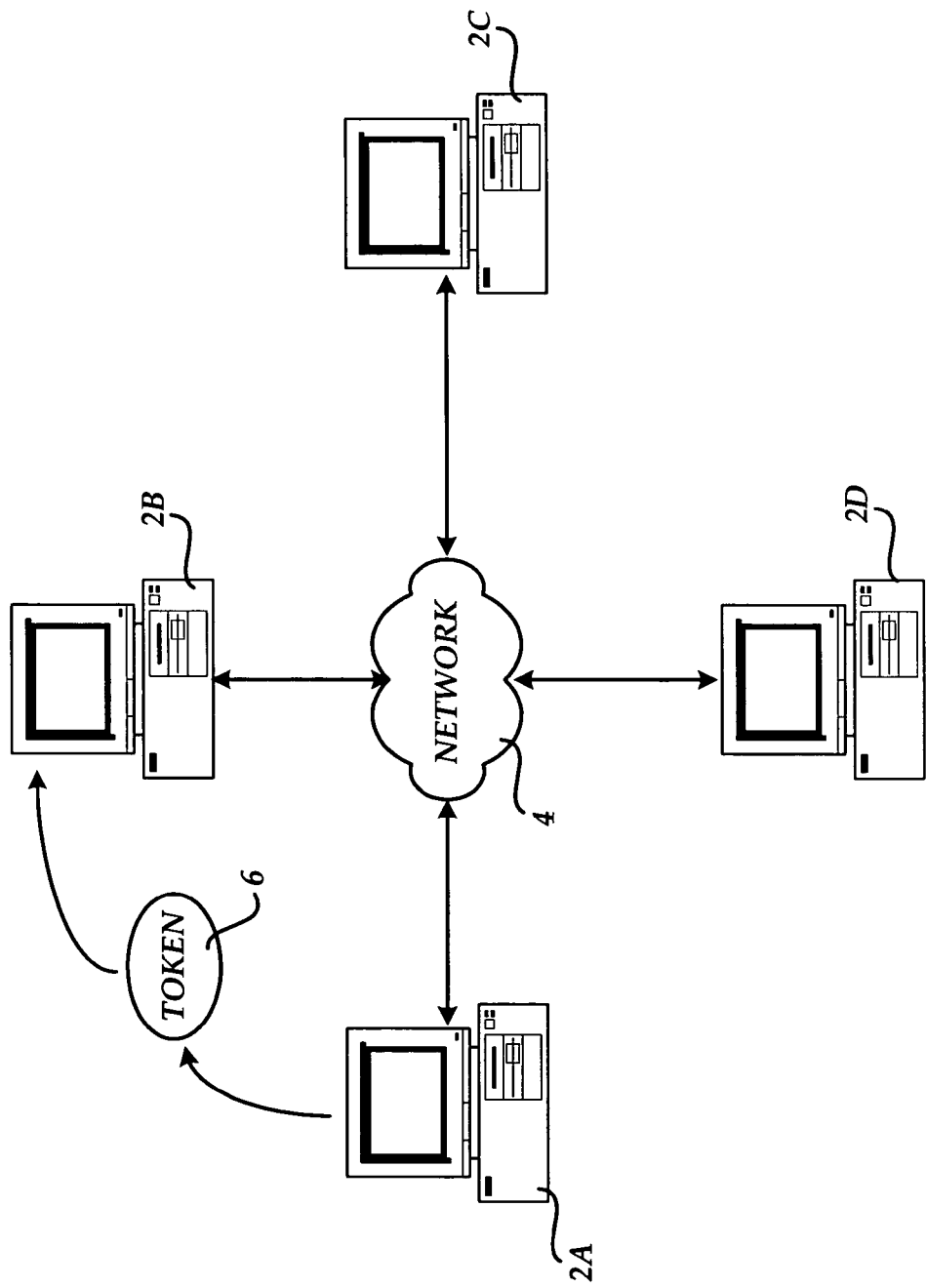
FIG. 1 is a computer network diagram illustrating aspects of an illustrative operating environment for the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 4 interconnects a number of computer systems 2A-2D. It should be appreciated that the network 4 may comprise any type of computing network, including a local area network ("LAN") or a wide area network ("WAN"), such as the Internet. The network 4 provides a medium for enabling communication between any number of computer systems 2A-2D, and potentially other computer systems connected to or accessible through the network 4. According to one embodiment of the invention, the network 4 comprises a transmission control protocol/internet protocol ("TCP/IP") network such as the Internet.

Each of the computer systems 2A-2D comprises a general purpose desktop, laptop, tablet, or other type of computer capable of executing one or more application programs. In particular, according to the various embodiments of the invention, the computer 2 is operative to execute a note-taking application. As known to those skilled in the art, a note-taking application program provides functionality for capturing and organizing notes, which may include text, handwriting, pictures, drawings, audio, or other information.

According to embodiments of the invention, the note-taking application program also allows near real time collaboration on a document generated by the note-taking application. As described herein, near real time means that updates to the document at each computer system 2A-2D participating in a collaborative session will be made as quickly as the network 4 will allow. In cases where high bandwidth network connections are utilized to connect the computer systems 2A-2D to the network 4, the response time will approach real time. Where slower network connections are utilized, the response time will be slower. However, as will be described in greater detail below, mechanisms are provided to ensure that computer systems participating in a sharing session via slower connections will enjoy very responsive performance without negatively affecting the performance of participants connected by higher bandwidth connections.

One way to ensure that even users on slow connections will have a responsive experience involves the fair passing of a synchronization token 6. The synchronization token 6 is passed between the computer systems 2A-2D participating in the sharing session. The synchronization token 6 is a data structure that authorizes the computer system that owns the data structure to make updates to the current state of the shared document. Ownership of the token will not prevent the user from making local changes. Additional details regarding the utilization of the synchronization token 6 to provide near real time collaboration will be provided below with respect to FIGS. 2-11.

It should be appreciated that, according to one embodiment of the invention, the note-taking application comprises the ONENOTE note-taking application program from MICROSOFT CORPORATION of Redmond, Wash. It should be appreciated, however, that the various aspects of the invention described herein may be utilized with other note-taking application programs from other manufacturers. Moreover, although the inventive aspects described herein are presented in the context of a note-taking application program, it should be appreciated that other types of application programs may also be utilized to embody the various aspects of the invention. For instance, the various aspects of the invention may be utilized with word processing programs, spreadsheet programs, drawing programs, computer-aided design programs, presentation programs, and any other type of computer program wherein it may be desirable to collaborate with one or more other users on the contents of a document.

Figure 2:
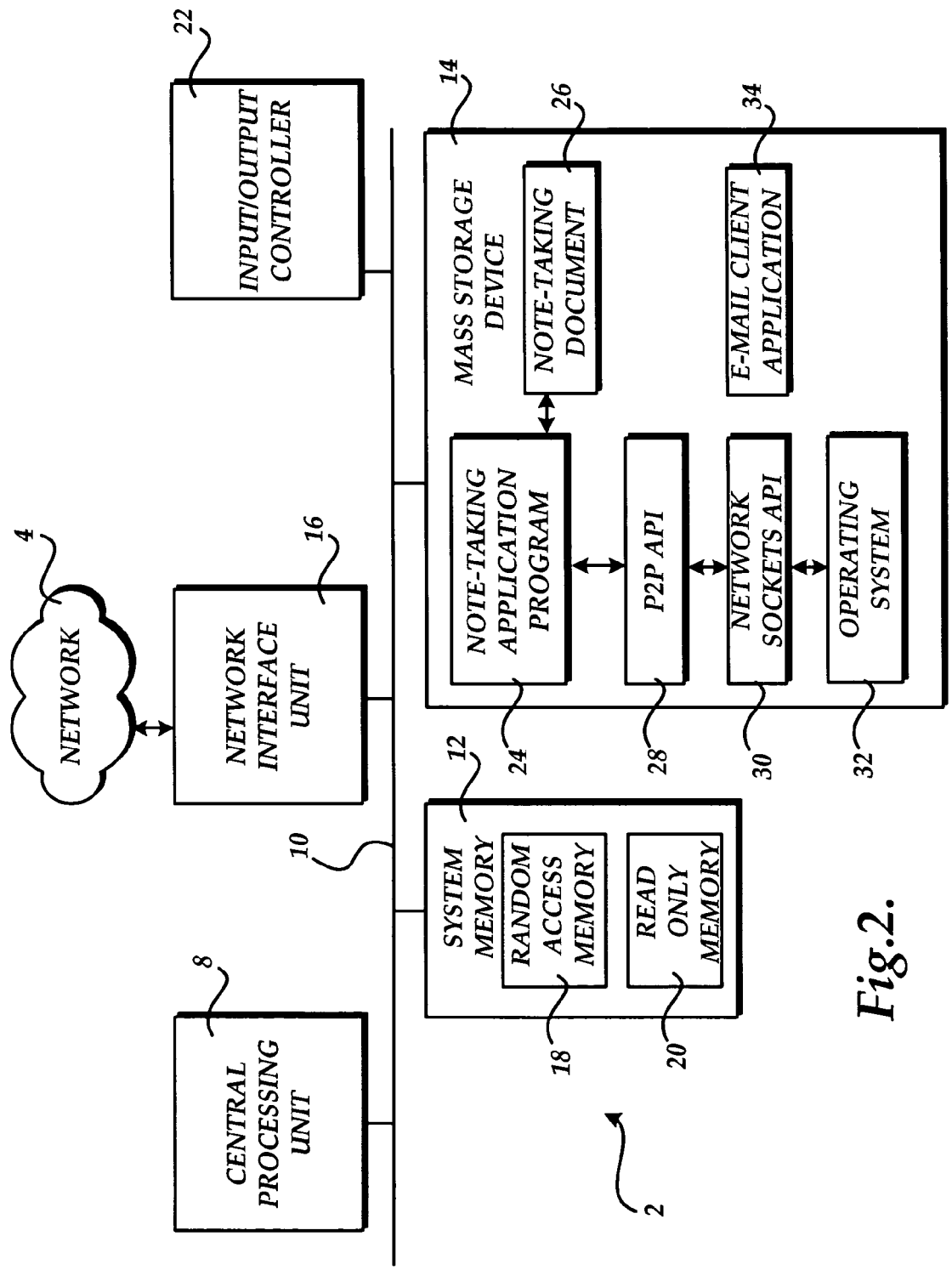
FIG. 2 is a computer system architecture diagram illustrating aspects of a computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop, laptop, or tablet computer, including a central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules, which will be described in greater detail below.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a TCP/IP network 4, such as the Internet. The computer 2 may connect to the network 4 through a network interface unit 16 connected to the bus 10. It should be appreciated that the network interface unit 16 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store a note-taking application program 24, as described above. As briefly described above, the note-taking application 24 comprises an application program for capturing and organizing notes, which may include text, handwriting, pictures, drawings, audio, or other information.

Notes may be organized by the note-taking application 24 into notebooks, folders, pages, and sections. Within a page, notes may be entered anywhere and later repositioned. Moreover, emphasis may be added to notes with bullet and list styles as wells as flags and highlighting. Full control may also be had over fonts, styles, sizes, and colors. When a user exits the note-taking application 24, the contents of the notebook may be saved in a note-taking document 26 on the mass storage device 14. Additional details regarding the operation of the ONENOTE note-taking application program are publicly available from MICROSOFT CORPORATION of Redmond, Wash.

In order to create a document sharing session, the note-taking application 24 utilizes a peer-to-peer ("P2P") application programming interface ("API") 28. The P2P API 28 utilizes a network sockets API 30 to provide media-independent networking services at the transport protocol and session protocol levels. The P2P API's media independence means that collaborative sessions can be run on TCP/IP networks, IPX networks, and over directly connected modems and serial cables. The P2P API 28 can create a P2P infrastructure that includes client/server and peer to peer networking sessions, group management, guaranteed and non-guaranteed messaging, sequenced and non-sequenced messaging, message fragmentation and reassembly, traffic throttling, message priorities, connection statistics, and session description queries.

According to one embodiment of the invention, the P2P API 28 comprises the DIRECTPLAY API from MICROSOFT CORPORATION. The DIRECTPLAY API is a public API and, as such, additional details regarding its use and implementation are publicly available from MICROSOFT CORPORATION. It should be appreciate the other technologies available from other manufacturers may also be utilized to create a peer to peer networking session among the computers 2A-2D.

The mass storage device 14 and RAM 18 may also store an e-mail client application 34. The e-mail client application 34 may be utilized to send and receive electronic mail messages containing invitations to join a sharing session. For instance, a user of one of the computers 2A-2D may begin a sharing session within the note-taking application 24 wherein one or more pages of the note-taking document 26 are shared. In order to invite other participants to the sharing session, the e-mail client application 34 may be utilized to create an electronic message directed to the other intended participants. The e-mail message may include as an attachment that is associated with the note-taking application program 24 and that includes the information necessary (internet protocol address, etc.) to connect to the sharing session.

When one of the intended recipients receives an electronic mail message from the session initiator that attachment to the message may be selected and executed. Execution of the attachment will cause the note-taking application 24 to execute and to connect to the sharing session utilizing the data contained in the attachment. Once connected to the sharing session, a copy is made of the shared document at each participant's computer system. In this manner, when a user joins the shared session, pages may be inserted into the notebook stored at their computer by the note-taking application 24. The various copies of the documents are then synchronized to one another as edits are made to the document by the various participants in the sharing session. The session initiator can specify whether users may edit the shared document on an individual or global basis.

Additional details regarding the synchronization of changes to the electronic document will be provided below. It should be appreciated that it is not necessary to transmit an e-mail invitation to the participants in the sharing session. The network address of the sharing session may be provided to the participants manually or through any other means. The network address may then be utilized to connect to the sharing session in a manual manner.

Figure 3A:
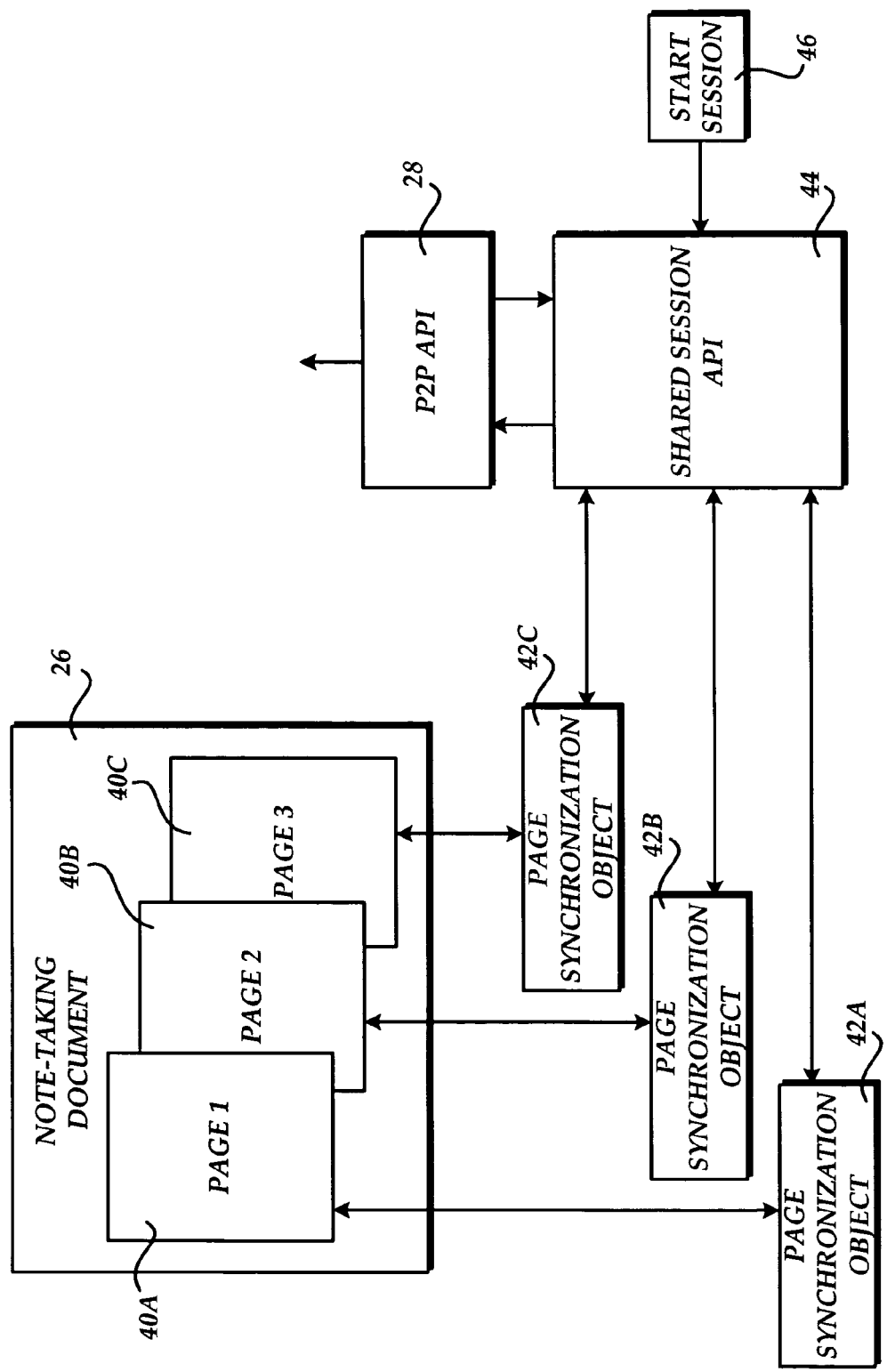
FIG. 3A is a computer software architecture diagram illustrating aspects of several software components utilized in the various embodiments of the invention.

Turning now to FIG. 3A, additional details will be provided regarding the creation of a new sharing session. As shown in FIG. 3A, the document 26 includes one or more pages 40A-40C that may be shared. When a request to start a new session is received, such as through the selection of a user interface button or menu item 46, a request is transmitted to a shared session API 44 provided by the note-taking application 24. The shared session API 44 coordinates the creation and joining of shared sessions, manages sessions, calls the P2P API 28 to perform communication, and performs other functions described herein.

When a new sharing session is created, the shared session API 44 creates a new page synchronization object 42A-42C for each page 40A-40C that is to be shared. Each page synchronization object 42A-42C is linked to a corresponding shared page 40A-40C. As will be described in greater detail below, each page synchronization object 42A-42C is responsible for monitoring for changes to the data model underlying each page, creating revisions to the data model describing the changes, and transmitting the revisions to corresponding page synchronization objects executing at each of the participating computer systems. The page synchronization objects 42A-42C are also responsible for receiving and merging revisions received from other computer systems and for performing other functions described herein.

Figure 3B:
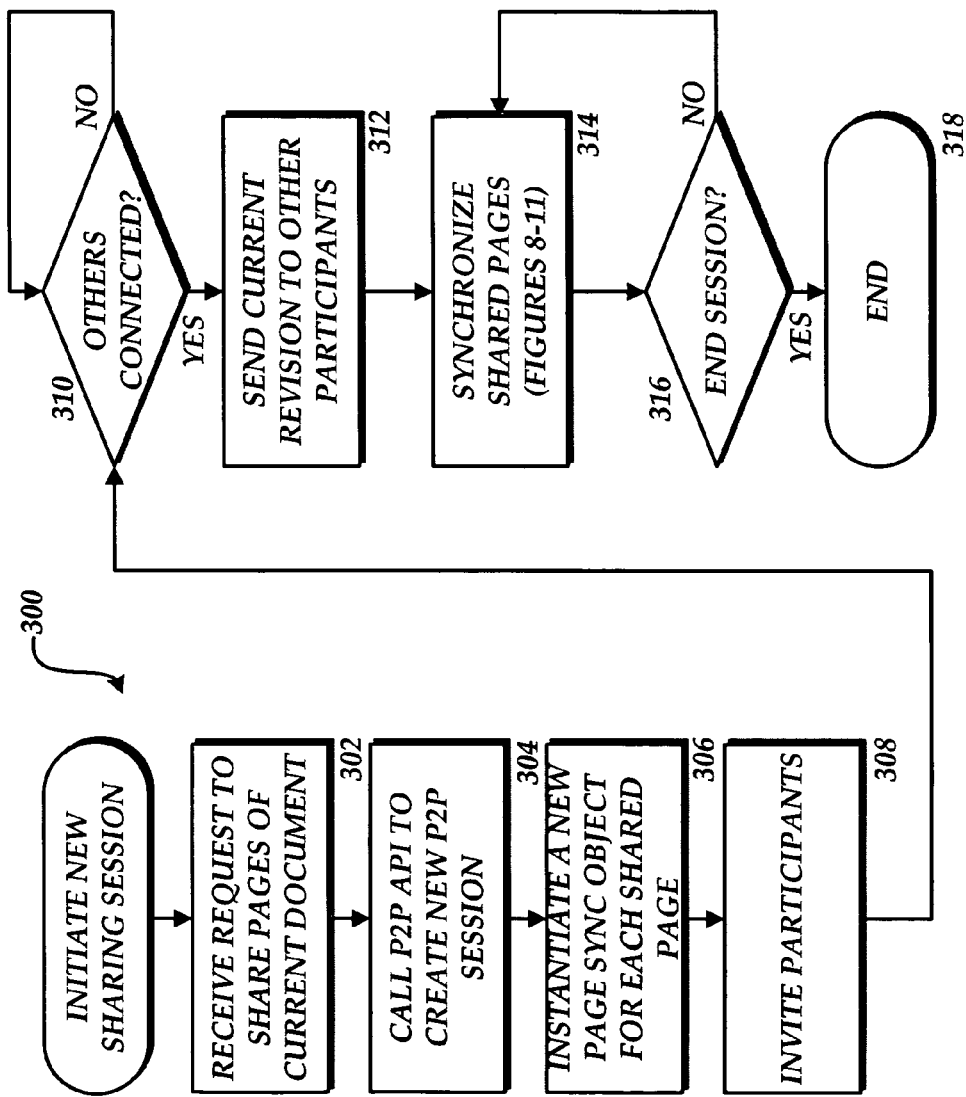
FIG. 3B is a flow diagram illustrating a process for initiating a new sharing session according to one embodiment of the invention.

Referring now to FIG. 3B, a routine 300 will be described illustrating a process performed by the note-taking application program 24 for initiating a new document sharing session. When reading the discussion of the routines and state machines presented herein, it should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in the state diagrams discussed herein, and making up the embodiments of the present invention described herein, are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a request is received, such as from a user, to share one or more pages of the current note-taking document. In response to the request the routine 300 continues to operation 304, where the shared session API 44 calls the P2P API 28 to create a new peer to peer session. From operation 304, the routine 300 continues to operation 306 where a new page synchronization object 42A-42C is created for each of the pages 40A-40C to be shared in the new session. Each page synchronization object 42A-42C is linked to a page 40A-40C and is connected to the new sharing session. It should be appreciated that when a participant joins a previously created session, page synchronization objects are also instantiated on the participant's computer system to control the updates for pages stored on that computer system.

From operation 306, the routine 300 continues to operation 308 where participants may be invited to join the new sharing session. As described above, invitations to join the sharing session may be transmitted to the other participants via electronic mail messages. Alternatively, other means may be utilized for inviting participants and for transmitting to the other participants the network address of the sharing session. From operation 308, the routine 308 continues to operation 310 where a determination is made as to whether other participants have joined the sharing session. It should be appreciated that the note-taking application 24 may be operated in a normal fashion while waiting for other participants to join the shared session and during the shared session.

If, at operation 310, it is determined that no other participants have joined the shared session, the routine 300 returns to operation 310 where another similar determination may be made. If, however, other users have joined the new sharing session, the routine 300 continues to operation 312. At operation 312, the current revision of each of the shared pages 40A-40C are transmitted to each of the new participants. As will be described in greater detail below, a revision identifies the changes made to the core data model that is utilized to represent the document 26 as a result of any edits. Because no revisions have been previously transmitted to the participants, the first revision comprises the complete state of the shared document. This is transmitted to other participants at operation 312.

From operation 312, the routine 300 continues to operation 314, where changes made to the shared document by any of the participants are exchanged and synchronized. By exchanging revisions and merging the revisions into the shared document in the manner described herein, near real time collaboration may be performed on the document even for users connected to the network 4 via a slow network connection. Additional details regarding the synchronization of shared pages is provided below with respect to FIGS. 8-11.

From operation 314, the routine 300 continues to decision operation 316, where a determination has been made as to whether the sharing session has ended. If the sharing session has not ended, the routine 300 branches back to operation 314, where the synchronization process continues. If the session has ended, the routine 300 continues to operation 318, where it ends.

Figure 4A:
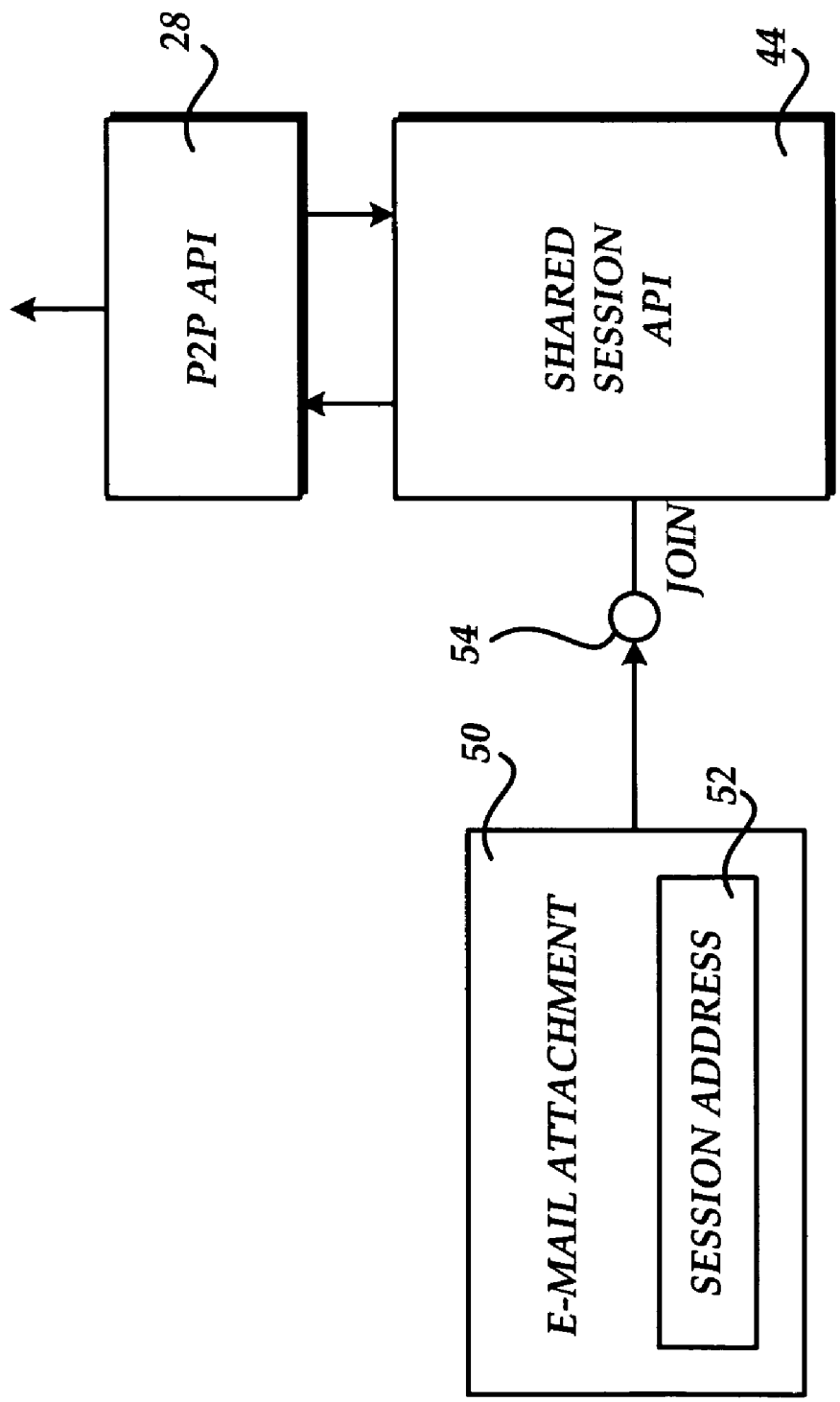
FIG. 4A is a computer software architecture diagram illustrating aspects of several software components utilized when joining an existing sharing session.

Referring now to FIG. 4A, additional details will be provided regarding the process for joining a previously created sharing session. As described above, an electronic mail message may be transmitted as an invitation to join a sharing session. The electronic mail message may include an attachment 50 that includes the session address 52 for the sharing session. When the attachment 50 is launched on a computer system, a join method 54 is called on the shared session API 44 with the session address 52. In response to calling the join method 54, the shared session API 44 calls the P2P API 28 with an instruction to join the sharing session. In response, the P2P API 28 is operative to connect to the sharing session via the network 4. Additional details regarding this process are described below with respect to FIG. 4B.

Figure 4B:
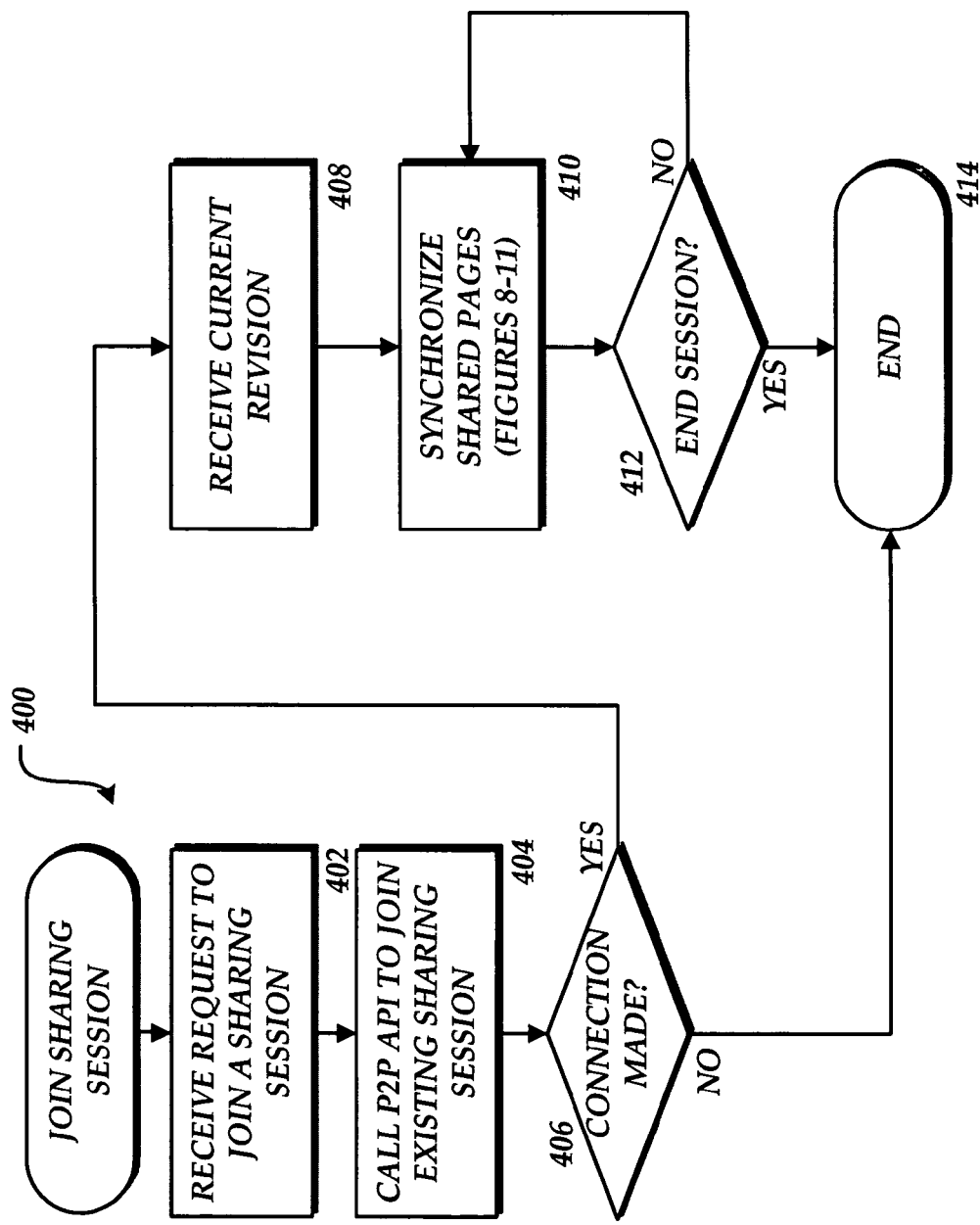
FIG. 4B is a flow diagram illustrating a process for joining an existing sharing session according to one embodiment of the invention.

FIG. 4B shows an illustrative process for joining a previously created sharing session. The routine 400 begins at operation 402, where an invitation is received to join an existing sharing session. When the invitation is selected, the routine 400 continues to operation 400 where the P2P API 28 stored on the participant's computer system is called with a request to join the existing sharing session. The routine 400 then continues to operation 406, where a determination if a connection has been established to the sharing session. If the connection cannot be made, the routine 400 continues to operation 414, where it ends. If the connection is established, the routine 400 continues from operation 406 to operation 408.

At operation 408, the current revision 408 to the shared document is received at the participant's computer. Because no previous revisions have been received, the first revision comprises the state of the document when the participant joins the session. Once the current revision has been received, the routine 40 continues to operation 410, where the contents of the shared pages are synchronized among all of the participants in the shared session. Additional details regarding the synchronization of the shared pages are provided below with respect to FIGS. 8-11.

From operation 410, the routine 400 continues to decision operation 412, where a determination has been made as to whether the sharing session has ended. If the sharing session has not ended, the routine 400 branches back to operation 410, where the synchronization process continues. If the session has ended, the routine 400 continues to operation 414, where it ends. It should be appreciated that any number of participants may join the shared session in the manner described above with respect to FIGS. 4A and 4B.

Referring now to FIGS. 5A and 5B, additional details will be provided regarding the operation of the note-taking application 24 and the data structure utilized by the note-taking application 24 to represent pages. FIG. 5A shows an illustrative on screen display provided by the note-taking application 24. As shown in the example page presented in FIG. 5A, the screen display represents a page 40D on which a user may make notes. In particular, a user may utilized the note-taking application 24 to add an outline object 60A to the page 40D. The outline object 60A may include one or more outline elements, such as the text 62A and the handwriting 62B. The text 62A may be typed utilizing a keyboard and the handwriting 62B may be made utilizing a stylus. A picture 64 may also be inserted into the page 40D. It should be appreciated that the display shown in FIG. 5A is merely illustrative and that other types of data may be entered into the page 40D.

FIG. 5B shows a data structure maintained by the note-taking application 24 for representing the contents of the page 40D shown in FIG. 5A. In particular, a direct acyclic graph ("DAG") 70A is utilized to internally represent the contents of a page. At the top of the DAG 70A, the node 72A is created corresponding to the page 40D. Under the node 72A, a node 73A is created corresponding to the outline element 60A and a node 80 is created corresponding to the picture 80. Under the node 73A, nodes 74A and 74B are created corresponding to the outline elements 62A and 62B. Under the node 74A, a node 76A is created for storing the actual contents, in this case the text "hello", for the outline element 62A. Similarly, under the node 74B, a node 78 is created for storing the handwriting in the outline element 62B. In this manner, the note-taking application 24 can represent pages having any number of objects and any level of complexity. It should be appreciated that a DAG 70A is created for each page maintained by the note-taking application 24. It should also be appreciated that the contents of the DAG are unimportant to the process of synchronization. Any data contained within the nodes of the DAG may be synchronized. In this manner, features may be added to or removed from the note-taking application 24 without effecting the synchronization mechanism. As will be described in greater detail below, changes to the DAG for each page may be identified and transmitted to other participants in the sharing session as revisions.

Figure 6B:
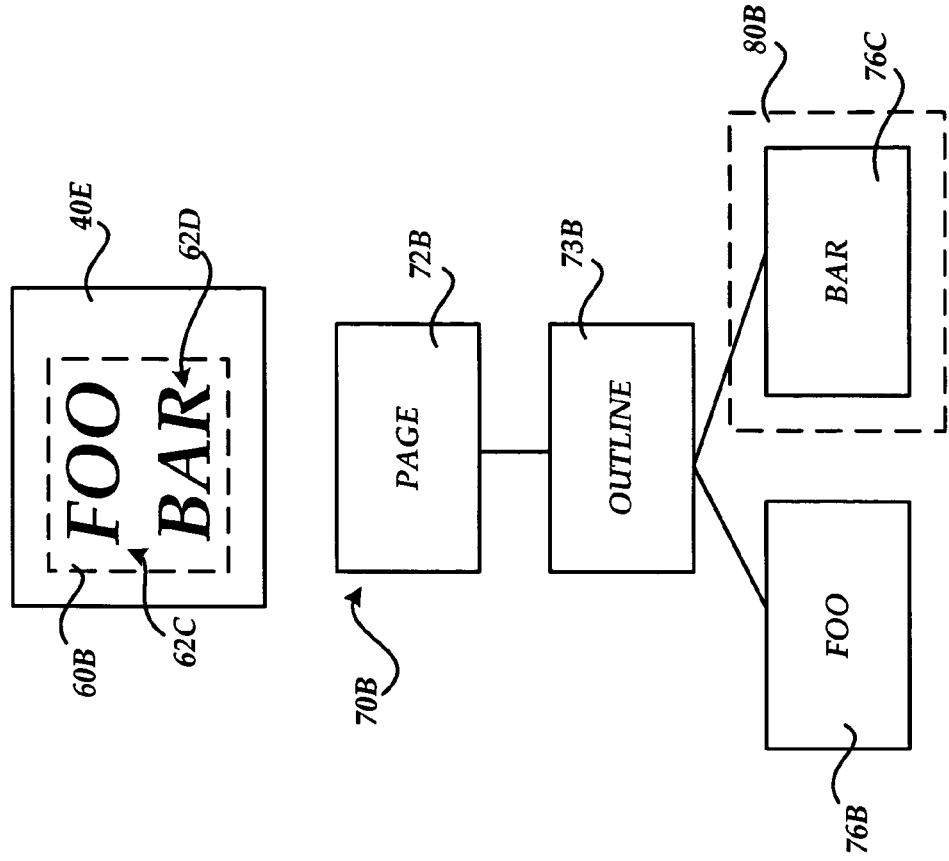
FIGS. 6A and 6B are data structure diagrams illustrating the process of creating a revision in the various embodiments of the invention.
Figure 6A:
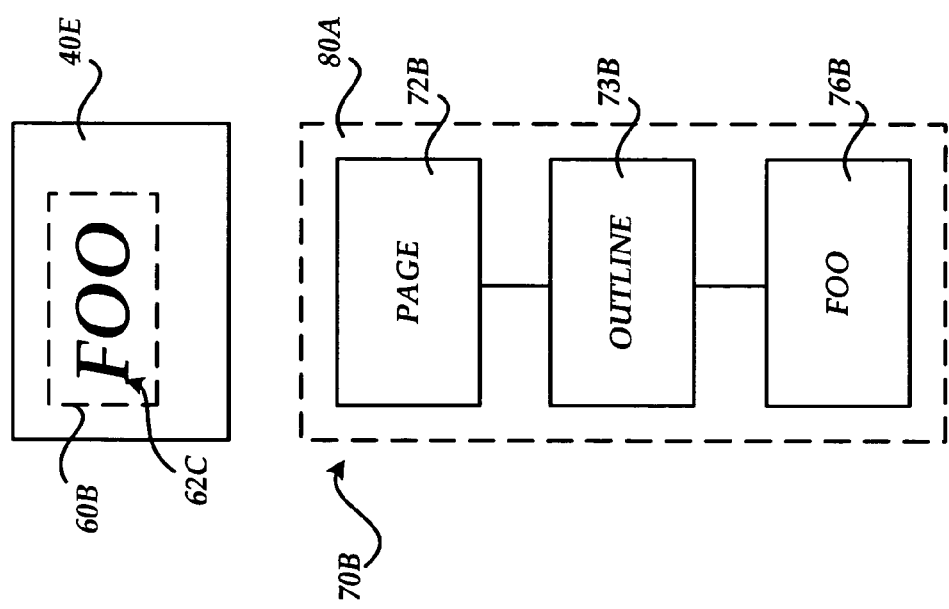

Referring now to FIGS. 6A and 6B, additional details regarding the process of capturing revisions to a DAG representing a shared page will be described. FIG. 6A shows an illustrative page 40E that includes an outline object 60B and text 62C contained within the outline object. The DAG 70B represents the contents of the page 40E. In particular, the node 72B represents the page object, the node 73B represents the outline object 60B, and the node 76B represents the text 62C. When a new sharing session is initiated, none of the contents of the DAG have been transmitted to other participants. Accordingly, the entire DAG is considered a revision 80A that must be transmitted to the other participants. Once the other participants receive the DAG 70B, only the changes made to the DAG 70B are exchanged between the participants. This process is illustrated in FIG. 6B.

FIG. 6B shows the page 40E described above with respect to FIG. 6A with the addition of additional text 62D. In particular, the text "BAR" has been added to the page 40E by a user. As a result, the DAG 70B has been updated to include a new node 76C representing the new text. In order to propagate the change in the DAG 70B to other participants in the sharing session, a new revision 80B is taken of the data structure.

The new revision 80B comprises only the portion of the DAG that was changed by a user since the last revision was taken. Accordingly, the new revision 80B encompasses only the node 76C including the newly added text. As will be described in greater detail below, once captured, the revision 76C may be serialized into a byte stream that is broadcast to the other participants. When the revision 76C is received by the other participants, its contents may be applied to the locally stored copies of the DAG 70B to reflect the changes made by the user at each participating computer system. The DAG 70B may then be utilized to render the page at each of the computer systems, thereby reflecting the change, provided the participants have the required dependent revisions for the revision. If the dependent revisions are not present, they must be requested. Because the render is incremental, it is efficient and fast. Additional details regarding the transmission, synchronization, and merging of revisions will be provided below.

Figure 7:
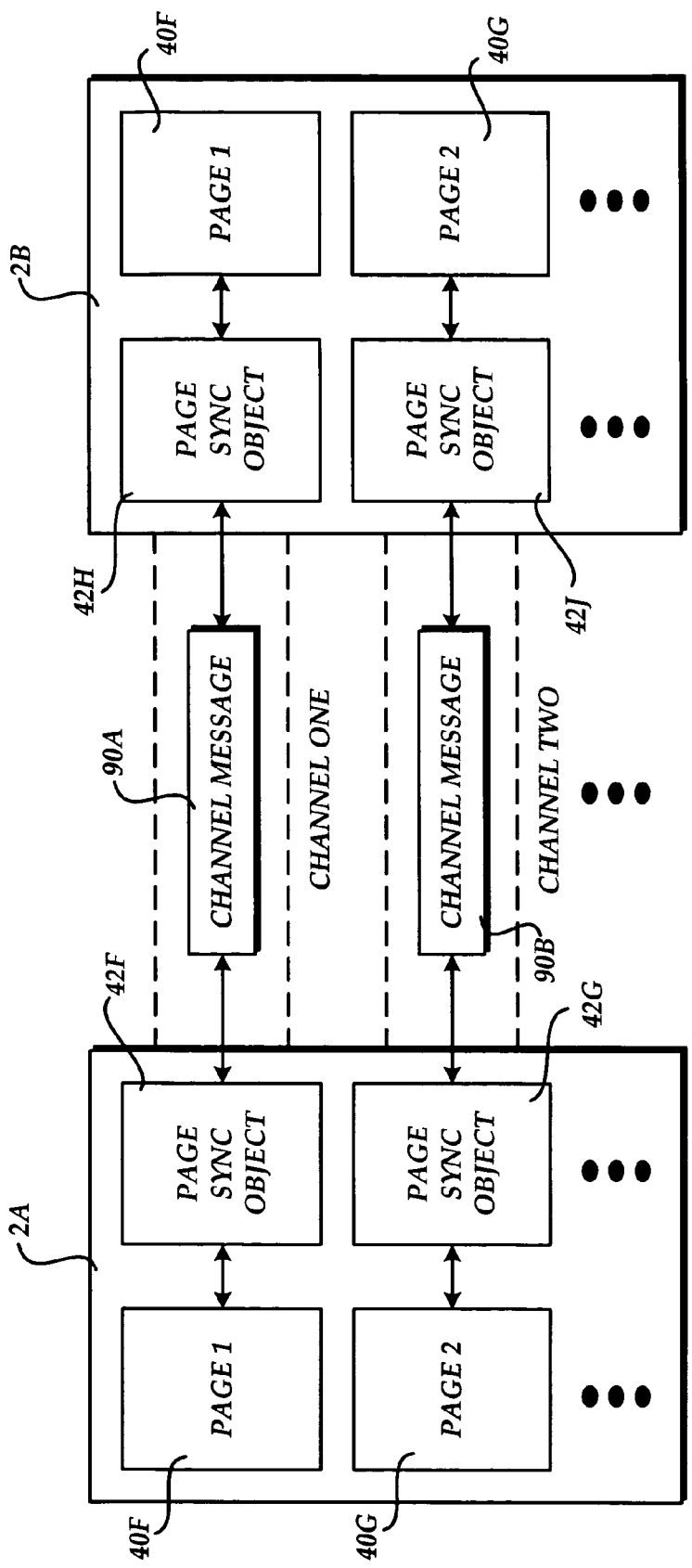
FIG. 7 is a computer software architecture diagram illustrating aspects of the several software components utilized in the various embodiments of the present invention.

Referring now to FIG. 7, additional details will be provided regarding the mechanism utilized to transmit and apply revisions among the various participants in a sharing session. FIG. 7 illustrates a computer system 2A and a computer system 2B participating in a sharing session. As described above, each of the computer systems 2A and 2B maintain copies of the shared pages 40F and 40G. Additionally, each of the computer systems 2A and 2B maintain page synchronization objects linked to the shared pages. The computer system 2A maintains the page synchronization objects 42F and 42G linked to the pages 40F and 40G, respectively. The computer system 2B maintains the page synchronization objects 42H and 42J linked to the pages 40F and 40G, respectively.

In order to simplify the communication between the participants in the sharing session, the peer to peer network is partitioned into channels. Each message exchanged between the participants is assigned a channel identification number and data identifying the channel number is transmitted with the message. Each page synchronization object "listens" on its own channel for messages. For instance, as shown in FIG. 7, the page synchronization objects 42F and 42H communicate by transmitting a channel message 90A on a first communications channel. Likewise, the page synchronization objects 42G and 42J communicate by transmitting a channel message 90B on a second communications channel. Other page synchronization objects may communicate on other channels in a similar fashion.

When a new participant joins an existing sharing session, a message is transmitted to the computer system that initiated the session. In response to receiving such a message, the host transmits the current revision to the new participant in the manner described above. Each page is transmitted on a new channel. When a participant receives a message on a channel for which it has not previously received a message, it creates a new page synchronization object for that channel. The participant also creates a new page and links the new page to the new synchronization object. When the current revision is first transmitted, it has no dependencies on other revisions, so the received revision can be utilized to replace the newly created page. In this manner, new pages and new page synchronization objects are created on each participating computer system in an automate manner.

It should also be appreciated that because page messages are transmitted on a per-channel basis, users may simultaneously edit different pages without resulting in the potential for conflicting edits and revisions. However, if users simultaneously edit the same page, the possibility arises that revisions will be taken that contain each users edits and placed on the network at the same time. This possibility results in the additional possibility for inconsistent states to be present on the network. To avoid this possibility, the various embodiments of the present invention utilize a synchronization token that is passed among the participants. The synchronization token is a data structure that authorizes the owner to make the next revision of the DAG data structure. If and only if a participant possesses the synchronization token is that participant authorized to declare a revision to the data structure. It should be appreciated that the synchronization token need not be owned for local changes to be made. The process of utilizing the synchronization token is described below with respect to FIG. 8.

Figure 8:
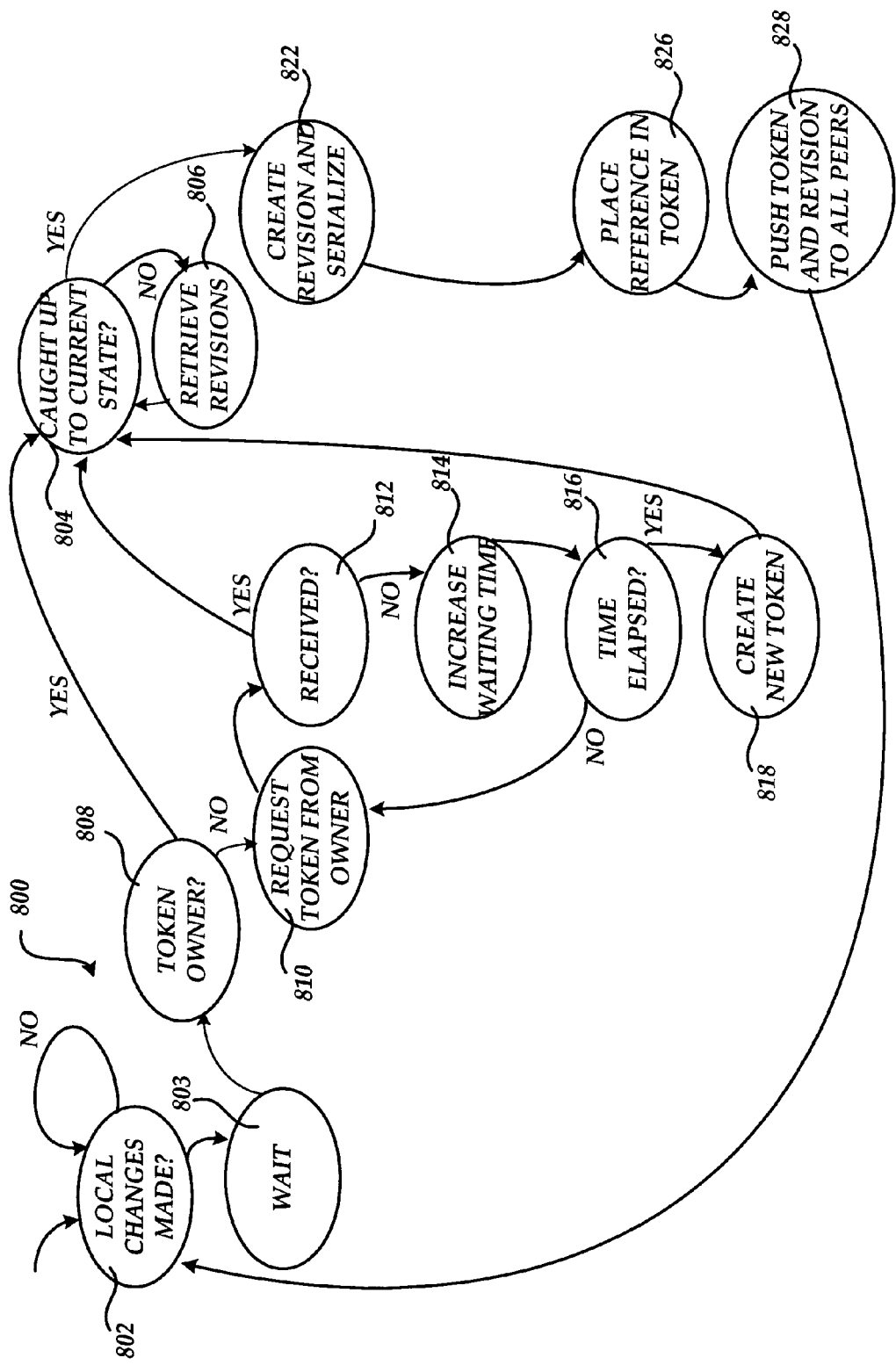
FIGS. 8-12 are state diagrams illustrating several processes for providing near real time collaboration on an electronic document according to the various embodiments of the invention.

Referring now to FIG. 8, an illustrative state machine will be describe that illustrates a process for specifying a new revision to the shared data structure. The state machine begins at state 802, where a determination is made as to whether local changes have been made to the data structure. If no changes have been made, it is not necessary to declare a new revision. Accordingly, the state returns to state 802 if no changes have been made. If changes have been made, the state transitions to state 803. At state 803, a predetermined period of time is spent waiting before creating a revision. This ensures that revisions will not be taken too frequently.

From state 803, the state transitions to state 808. At state 808, a determination is made as to whether the computer system where the edits were made is the current owner of the synchronization token. If the computer system is the current owner, the state machine transitions to state 804. If the computer system is not the current owner, the state machine transitions to state 810, where a request for the token is transmitted to the current owner of the synchronization token. The state machine then transitions to state 812.

At state 812, a determination is made as to whether the synchronization token has been received. If the token has been received, the state transitions to state 804. If the token has not been received, the state transitions to state 814. At state 814, the time that the computer system has been waiting to receive the synchronization token is increased. As will be described in greater detail below, the waiting time is included with the request for the synchronization token. This data is utilized by a participant when determining which computer system the synchronization token should be sent to. In particular, the computer system that has been waiting the longest for the synchronization token is given the token. More details regarding this process are described below.

From state 814, the state transitions to state 816. At state 816, a determination is made as to whether a predetermined period of time has elapsed without any response to the request for the synchronization token. If an extended period of time has elapsed, this may indicate that the token has been lost for instance by the owner of the token being disconnected from the network 4. Accordingly, if the time period has elapsed, the state machine transitions to state 818 where a new token is created using the current revision/state as the basis. If the time period has not elapsed, the state transitions back to state 810 where another request for the synchronization token is transmitted with the updated waiting time. The token owner can also elect to deny the request, in which case a denial message will be received. The requestor will then wait a short time and then re-request again—i.e. transition back to state 810.

From state 818, the state transitions to state 804 where a determination is made as to whether the current state of the DAG is caught up with all other revisions made by other participants. If the graph is not current, the state transitions to state 806, where the revisions necessary to make the data structure current are requested and received from the other participants. Once the necessary revisions have been received, the state transitions from state 806 back to state 804.

If, at state 804, it is determined that the data structure is current, the state machine transitions to state 822, where the revision is taken in the manner described above and serialized for transmission over the network 4. The state then transitions to state 826, where a reference in the form of an ID is placed in the token. The state then transitions to state 828, where the token and the revision is pushed to all of the participants in the sharing session. The state then returns from state 828 to state 802 if the user is not being throttled as described below. According to embodiments of the invention, a throttling mechanism exists such that a revision will only be pushed to a participant if the participant has finished processing the last revision it received. When the participant finishes processing its last revision then the most recent revision is sent. If the participant cannot keep up with the flow of revisions, then some of the revisions may be skipped. This is equivalent to lowering the "frame rate" for the participant. Details regarding processes for merging received revisions into the data structure, for detecting and correcting the existence of multiple tokens, and for receiving and responding to requests for the token in a fair manner are described below with respect to FIGS. 9-11.

Figure 9:
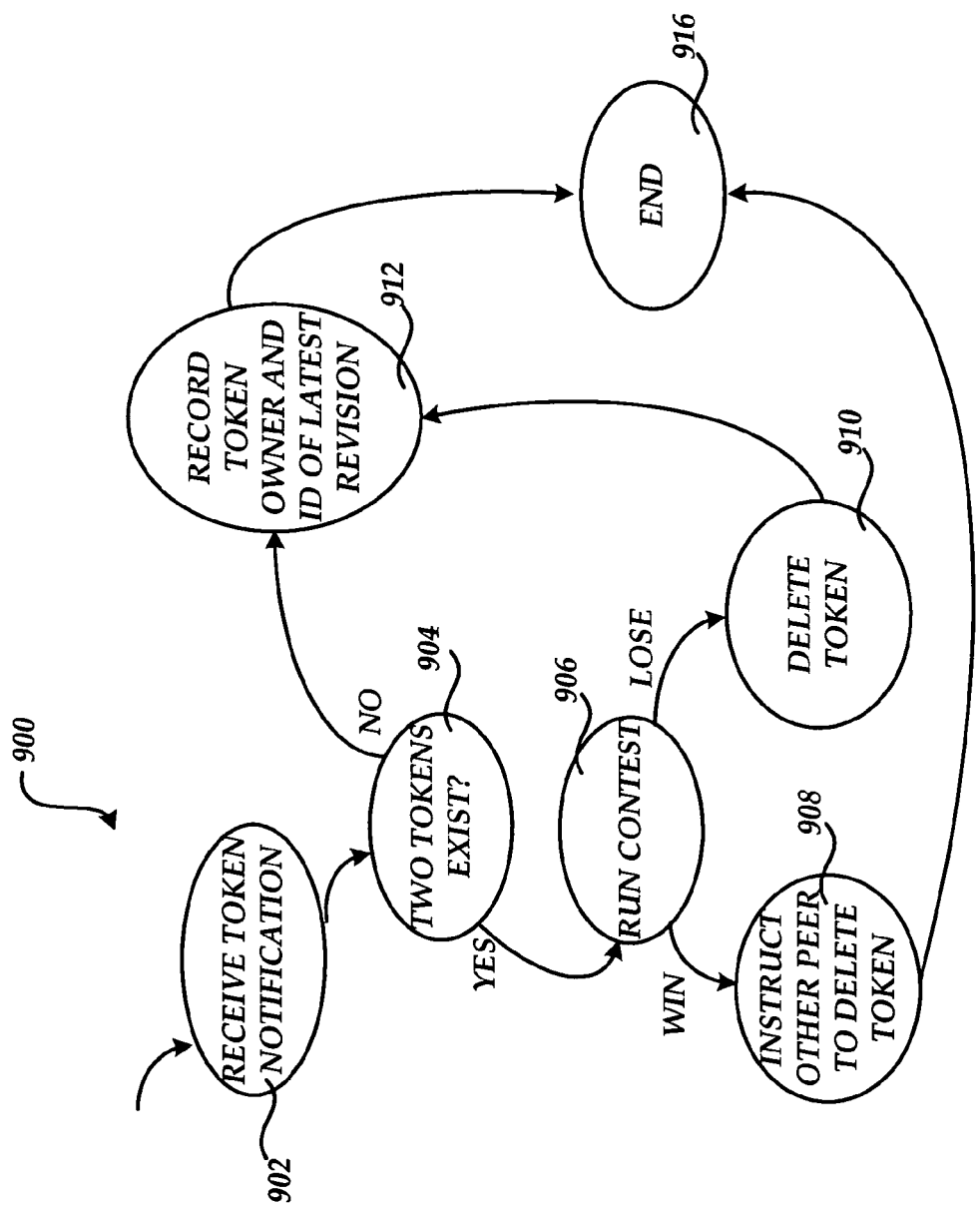

Turning now to FIG. 9, an illustrative state machine 900 will be described illustrating a process for receiving a token containing a revision. The state machine 900 begins at state 902, where a synchronization token notification is received. The token owner frequently broadcasts an indication that they are the owner of the token. If such an indication is received, the state machine 900 then continues to operation 904, where a determination is made as to whether two synchronization tokens exist among the participants in the sharing session. This determination is made by determining if the participant that received the notification already owns the token. If so, then two tokens exists. If two tokens do not exist, the state transitions to state 912. If two tokens do exist, the state transitions to state 906.

At state 906, a "contest" is performed to determine which of the two tokens should be utilized and which should be deleted. The contest comprises a deterministic algorithm executed at both computers owning a synchronization token. For instance, the algorithm may simply compare the unique integer identification numbers assigned to each peer to determine which number is larger. The peer with the larger number wins the contest and the peer with the lower number loses the contest. It should be appreciated that other types of deterministic algorithms may also be utilized.

If, at state 906, it is determined that the computer system has won the contest, the state transitions to state 908, where an instruction is transmitted to the other peer owning a token instructing the peer to delete their token. The state then transitions to state 912, where it ends. In this manner, the rightful owner of the token can continue its processing in a normal fashion.

If, at state 906, it is determined that the computer system has lost the contest, the state transitions to state 910, where the received token is deleted. The state then transitions to state 912, where the token owner and the ID of the latest revision are recorded for future reference. This information is utilized later to know who to request the token from. From state 912, the state machine 900 transitions to state 916, where it ends. It should be appreciated that the processes illustrated in FIGS. 8, 9, 10, and 12 are performed independently and potentially in parallel.

Figure 10:
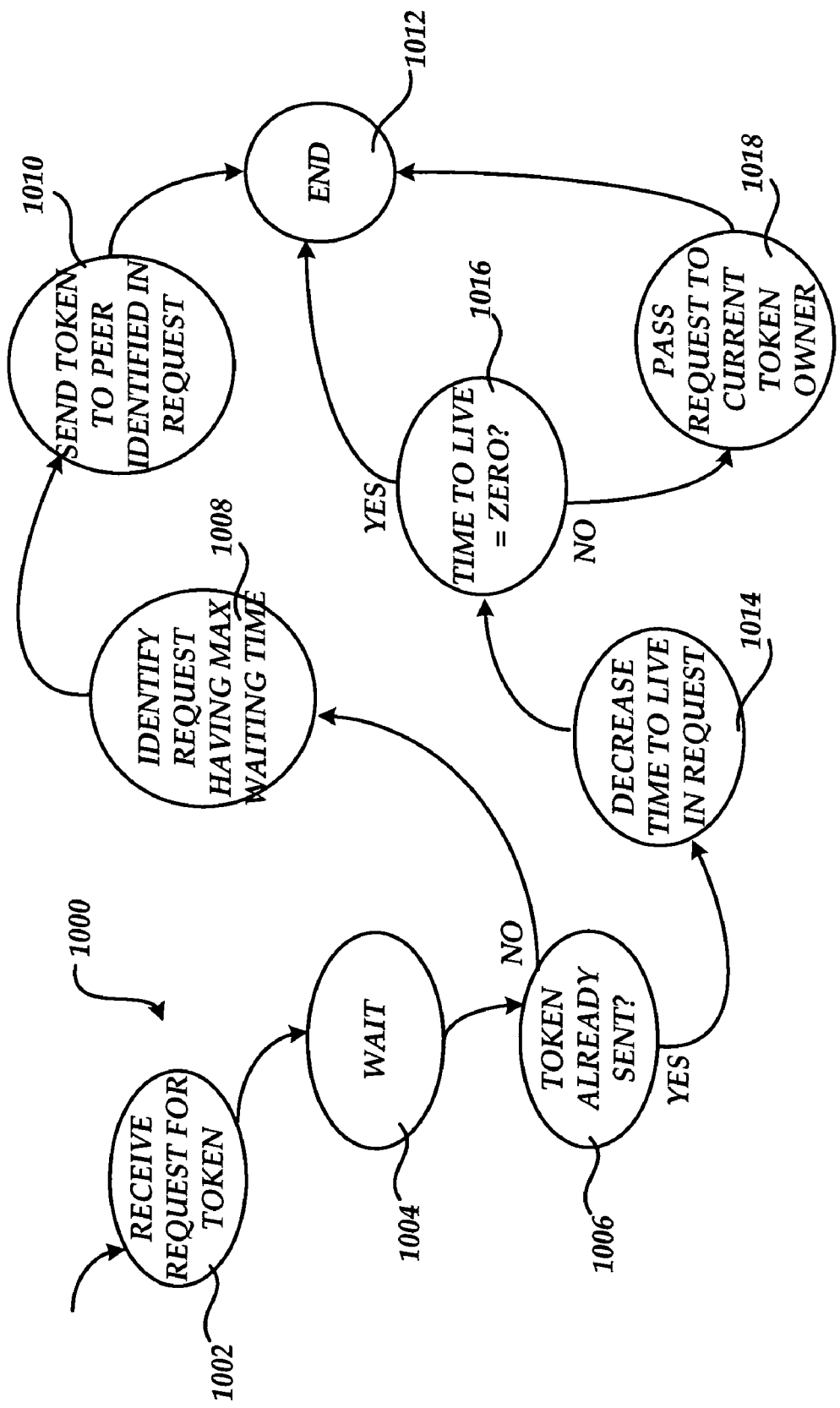

Turning now to FIG. 10, an illustrative state machine 1000 will be described for receiving and responding to requests for the synchronization token in a fair manner. The state machine 1000 begins at state 1002, where a request for the synchronization token is received. The state machine transitions from state 1002, to state 1004, where a predetermined period of time is allowed to pass prior to continuing. The state machine then transitions to state 1006, where a determination is made as to whether the synchronization token has already been forwarded on to another one of the peers. If the synchronization token has not yet been forwarded, the state machine 1000 transitions to state 1008.

At state 1008, a determination is made if more than one request for the token has been received as to which of the requests specifies the largest amount of time waiting for the token. The state machine 1000 then transitions to state 1010, where the token is transmitted to the computer system that transmitted the request for the synchronization token having the longest time spent waiting. In this manner, the peer that has been waiting the longest for the token will receive the token. From state 1010, the state machine 1000 transitions to state 1012, where it ends.

If, at state 1006, it is determined that the token has already been sent to another peer, the state machine transitions to state 1014. At state 1014, a "time to live" value set forth in the request for the synchronization token is decreased by one. The time to live value specifies the number of times the request should be forwarded to the new owner of the synchronization token before it expires. The state machine then transitions to state 1016, where a determination is made as to whether the request has expired. If the request has expired, the state machine transitions from state 1016 to state 1012, where it ends. If the request has not expired, based on the time to live value, the state transitions to state 1018, where the request (including the reduced time to live value) is forwarded to the new owner of the synchronization token. In this manner, a late request for the synchronization token may be injected into the high speed network. From state 1018, the state machine transitions to state 1012, where it ends.

Figure 11:
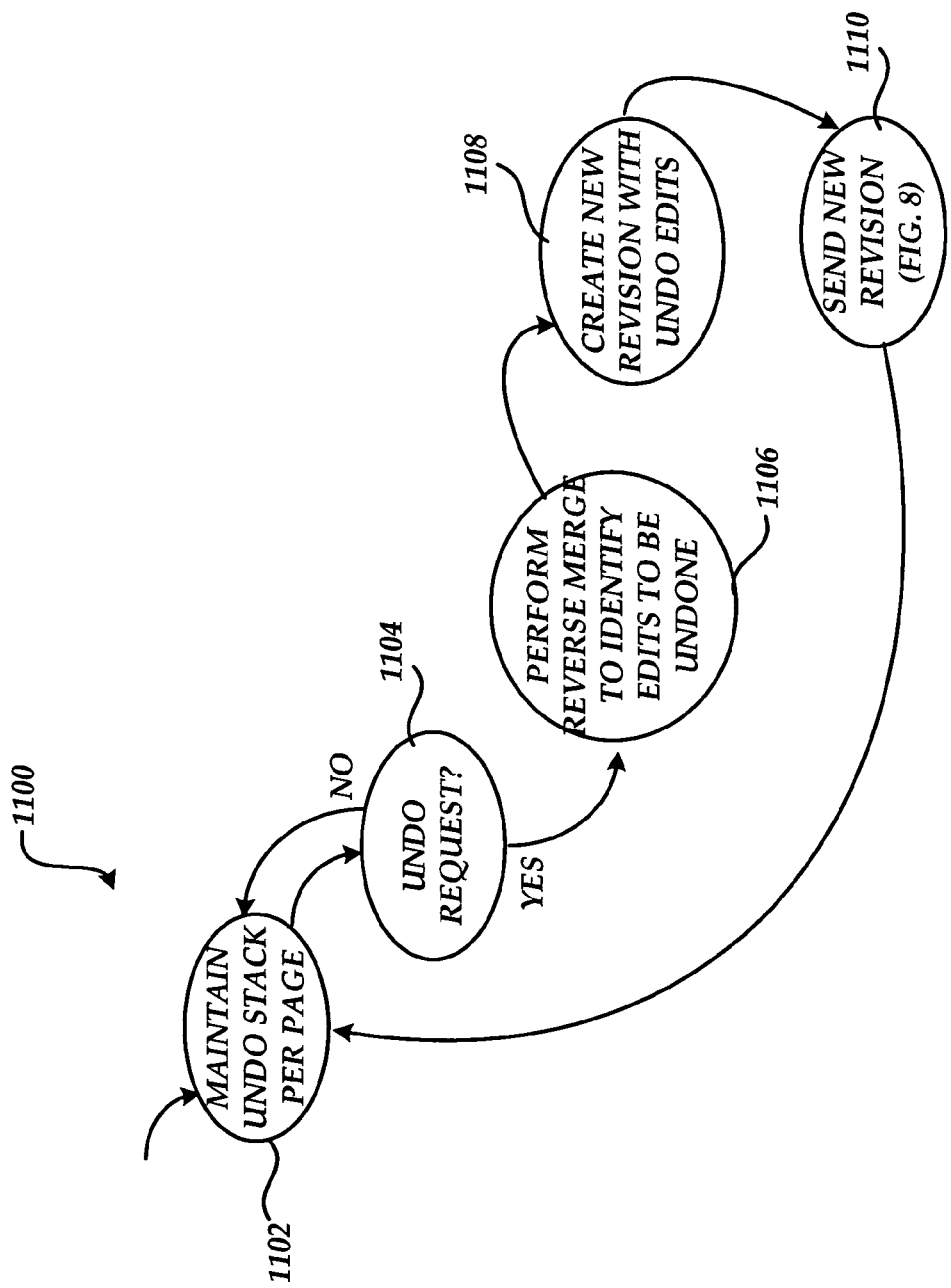

Turning now to FIG. 11, an illustrative state machine 1100 will be described showing a feature of the invention for allocating separate undo stacks to each user in a collaboration session. The state machine 1100 begins at state 1102, where an undo stack is maintained for each page at each computer system participating in a sharing session. The undo stack tracks the changes made to the DAG so that these changes may later be "undone" in response to a user request.

From state 1102, the state machine 1100 transitions to state 1104, where a determination is made as to whether an undo request has been received. If no undo request has been received, the state machine 1100 transitions back to state 1102. If an undo request is received, the state machine transitions to state 1106, where a reverse merge is performed on the DAG to determine the edits that should be undone. The state then transitions to state 1108, where a new revision is created that includes the undo edits. The state machine then transitions to state 1110, where the new revision is propagated to the other participants in the sharing session. In this manner, each edits by any individual user on any individual page may be easily undone. From state 1110, the state machine 1100 transitions to state 1102, where it ends.

Figure 12:
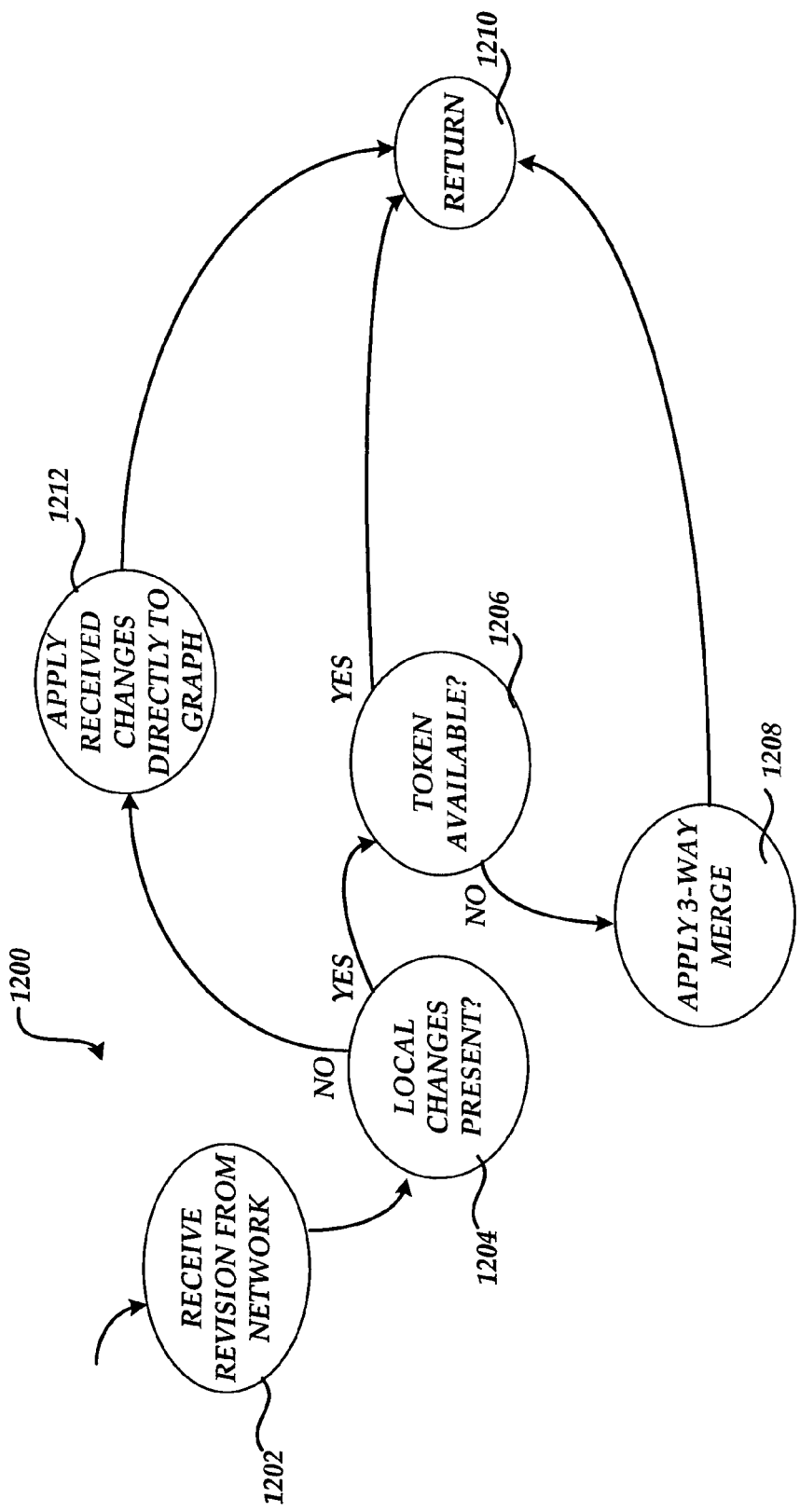

Referring now to FIG. 12, an illustrative state machine 1200 will be described for merging revisions made to the graph. The state begins at state 1202, where a revision is received from the network. If the revisions are the most recent revisions to the DAG (i.e. if old revisions are received, they are not applied to the DAG), then the state then transitions to state 1204, where a determination is made as to whether local changes are present. If local changes have not been made, the state transitions to state 1212, where the received revision is applied directly to the graph. The state then transitions to state 1210, where it returns.

If, at state 1204, it is determined that local changes have been made, the state transitions to state 1206. At state 1206, a determination is made as to whether the synchronization token is available. If the token is available, the state transitions to state 1210, where it returns. In this manner, if a new revision is received and changes have been made to the document, the 3-way merge is performed at state 1208 to apply the local changes to the revision that has just been received. Any local changes are transmitted to other participants n the process outlined above with respect to FIG. 8.

If, at state 1206, it is determined that the token is unavailable, the state transitions to state 1208, where a 3-way merge is performed. The inputs to the 3-way merge are: a base line, which is the last revision received from the network; an update from the network (derived from the revision); and local changes. By performing a three-way merge on the current state of the graph, the local edits, and the received revision, an up-to-date version of the graph may be computed while still maintaining the local edits as a revision for future transmission to the other participants when the token becomes available. From state 1208, the state transitions to state 1210, where it returns.

Based on the foregoing, it should be appreciated that the various embodiments of the invention include a method, system, apparatus, and computer-readable medium for near real time collaboration on an electronic document. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for enabling near real time collaboration on an electronic document through a plurality of computer systems, the method comprising:
   initiating a sharing session on a first computer system, wherein initiating the sharing session comprises:
      creating a page synchronization object, and
      creating channels to communicate with the first computer system;
   accepting requests from at least a second computer system to join the sharing session;
   maintaining a data structure representing the entire contents of the electronic document;
   receiving user input at one of the plurality of computer systems joined to the sharing session, the user input comprising a modification to the data structure;
   adding, in response to the received user input, a new node representing the modification to the data structure;
   in response to the modification to the data structure, creating a revision that identifies only the modification to the data structure, wherein creating the revision comprises:
      periodically identifying changes to the data structure, and
      periodically collecting the identified changes to the data structure as a result of the modification; and
   transmitting the revision to each of the plurality of computer systems joined to the sharing session other than the one computer system at which the input was made, wherein transmitting the revision to each of the plurality of computer systems joined to the sharing session comprises:
      determining whether a synchronization token is present,
      serializing the revision,
      placing a reference in the synchronization token,
      sending the serialized revision and the synchronization token with the reference, wherein sending the serialized revision and the synchronization token with the reference comprises using a throttling mechanism associated with sending the serialized revision only to computer systems of the plurality of computer systems that have finished processing a previous revision of the data structure, and
   applying the revision to a locally stored copy at each receiving computer system of the plurality of computer systems joined to the sharing session.

2. The method of claim 1, further comprising:
   receiving the revision at another one of the plurality of computer systems not having inputted the modification;
   merging the revision into a version of the data structure maintained at the other one of the plurality of computer systems; and
   displaying the contents of the data structure at the other one of the plurality of computer systems.

3. The method of claim 2, further comprising prior to transmitting the revision:
   determining, at the one computer system providing the received user input, whether the data structure is current; and
   if the data structure is not current, retrieving and merging necessary revisions to make the data structure current.

4. The method of claim 1, further comprising, prior to transmitting the revision:
   determining, at the one computer system providing the received user input, whether the one computer system is an owner of the synchronization token;
   in response to determining that the one computer system is not the owner of the synchronization token, requesting the synchronization token from the owner of the synchronization token; and
   in response to determining that the one computer system is the owner of the synchronization token, transmitting the revision to each of the plurality of computer systems joined to the sharing session other than the one computer system at which the input was made.

5. The method of claim 4, wherein requesting the synchronization token from the owner of the synchronization token comprises:
   generating a request for the synchronization token, the request including data indicating a duration of time the one computer system has been waiting for the synchronization token;
   transmitting the request to a corresponding computer system owning the synchronization token;
   determining whether the synchronization token has been received;
   in response to determining that the synchronization token has not been received, generating a new request for the synchronization token, the new request including data indicating an extended duration of time the one computer has been waiting for the synchronization token; and
   transmitting the new request to the corresponding computer system owning the synchronization token.

6. The method of claim 5, further comprising:
   receiving the synchronization token at the one computer system providing the received user input;
   determining whether two synchronization tokens exist; and
   in response to determining that two synchronization tokens exist, performing a calculation to determine which of the two synchronization tokens should be deleted.

7. The method of claim 5, further comprising:
   receiving the request for the synchronization token at the corresponding computer system owning the synchronization token;
   in response to the request, determining whether the synchronization token has been previously transmitted to any one of the plurality of computer systems;
   if the synchronization token has not been previously transmitted, identifying the request for the synchronization token having the longest duration of time waiting for the synchronization token; and transmitting the synchronization token to a pending computer system that transmitted the request for the synchronization token having the longest duration of time spent waiting.

8. The method of claim 7, further comprising:
if the synchronization token has been previously transmitted,
decreasing a time to live value in the request for the synchronization token,
determining whether the time to live value is greater than zero, and
if the time to live value is greater than zero, forwarding the request to a current owner of the synchronization token.

9. The method of claim 1, wherein the data structure comprises a direct acyclic graph.

10. A computer-readable medium having computer-executable instructions stored thereon which, when executed by a computer, will cause the computer to perform the method of claim 1.

11. A computer-controlled executable storage apparatus capable of performing the method of claim 1.

12. A method for enabling near real time collaboration on a page of an electronic document through a plurality of computer systems, the method comprising:
initiating a sharing session on one of the plurality of computer systems;
accepting requests respectively from others of the plurality of computer systems to join the sharing session;
maintaining a graph at each of the computer systems joined to the sharing session, the graph identifying a content of the page of the electronic document;
receiving at a first of the plurality of computer systems joined to the sharing session a change to the page, the change to the page resulting in a corresponding change to the graph;
generating a revision to the graph in response to the change, the revision comprising data identifying only the change to the graph, wherein generating the revision comprises:
periodically identifying changes to a data structure, and
periodically collecting the identified changes to the data structure as a result of the change to the graph;
transmitting the revision from the first of the plurality of computer systems to each of the other computer systems joined to the sharing session, wherein transmitting the revision to each of the plurality of computer systems joined to the sharing session comprises:
determining whether a synchronization token is present,
serializing the revision,
placing a reference in the synchronization token,
sending the serialized revision and the synchronization token with the reference, wherein sending the serialized revision and the synchronization token with the reference comprises using a throttling mechanism associated with sending the serialized revision only to computer systems of the plurality of computer systems that have finished processing a previous revision of the data structure, and
applying the revision to a locally stored copy at each receiving computer system of the plurality of computer systems joined to the sharing session, wherein applying the revision to a locally stored copy comprises:
determining whether at least one local change is present at a receiving computer system receiving the revision,
in response to determining whether at least one local change is present, determining whether the synchronization token is available at the receiving computer system of the plurality of computer systems,
in response to determining whether the synchronization token is available at the receiving computer system of the plurality of computer systems:
applying the at least one local change to the revision, and
transmitting the revision to others of the plurality of computer systems joined to the sharing session other than the computer system at which the at least one local change was made,
in response to determining whether the synchronization token is not available at the receiving computer system of the plurality of computer systems, merging the following:
a base line, wherein the baseline is the last version received,
the revision, and
the at least one local change; and
merging the revision into the graph maintained at each of the other computer systems joined to the sharing session; and
transmitting a current version of the data structure representing the entire contents of the electronic document to the others of the plurality of computer systems that joined the sharing session after the revision, wherein transmitting the current version of the data structure comprises:
creating a synchronization object for each new channel that has not previously received a request to join the sharing session,
creating a new page,
linking the new page to the synchronization object, and
transmitting the content of the electronic document on each new channel, wherein transmitting each content of the electronic document on each new channel comprises:
allowing users to edit different contents without at least one of the following: conflicting edits and conflicting revisions, and
allowing users to edit the same content.

13. The method of claim 12, further comprising, prior to transmitting the revision:
determining whether the first of the plurality of the computer systems is the owner of the synchronization token; and
transmitting the revision only if the first computer system is the owner of the synchronization token.

14. The method of claim 13, further comprising:
receiving at the first computer system at least one request for the synchronization token from the other computers, each request specifying an amount of time the requesting computer system making the request has been waiting to receive the synchronization token;
in response to receiving the at least one request for the synchronization token, determining, from the requests, the computer that has been waiting the longest amount of time for the synchronization token; and
transmitting the synchronization token to the computer that has been waiting the longest amount of time.

15. The method of claim 14, further comprising in response to receiving the at least one request for the synchronization token:

determining whether the synchronization token has been previously forwarded; and in response to determining that the synchronization token has been previously forwarded:

decreasing a time to live value in each of the received requests for the synchronization token, and forwarding the requests to a current owner of the synchronization token.

16. The method of claim 15, further comprising:

determining whether two synchronization tokens exist; and in response to determining that two synchronization tokens exist, executing an identical algorithm at each of the computer systems owning any one of the two synchronization tokens to determine which of the two synchronization tokens should be deleted.

17. The method of claim 1, further comprising:

executing at each of the plurality of computers systems a page synchronization object operative to listen on a communications channel for revisions to the page, to receive revisions to the page, and to modify the graph when revisions have been received.

18. The method of claim 17, wherein the electronic document comprises multiple pages and wherein the synchronization object is created for each page.

19. A computer-readable medium having computer-executable instructions stored thereon which, when executed by a computer, will cause the computer to perform the method of claim 12.

20. A computer-controlled executable storage apparatus capable of performing the method of claim 12.

* * * * *